United States Patent [19]

Shodai

[11] Patent Number: 4,973,859
[45] Date of Patent: Nov. 27, 1990

[54] ELECTRIC CONNECTING DEVICE

[75] Inventor: Kenji Shodai, Hiroshima, Japan

[73] Assignee: Mazda Motor Corporation, Hiroshima, Japan

[21] Appl. No.: 302,322

[22] Filed: Jan. 27, 1989

[30] Foreign Application Priority Data

Jan. 28, 1988 [JP] Japan .................................. 63-18091

[51] Int. Cl.⁵ ...................... H01R 13/44; B60R 21/32
[52] U.S. Cl. .................................. 307/10.1; 439/138; 439/137; 280/735
[58] Field of Search ........................ 307/9.1, 10.1, 121, 307/326; 340/429, 436, 438, 457, 457.1, 466, 467, 669, 652; 324/500, 503, 538; 280/735; 439/137, 138, 502, 638

[56] References Cited

U.S. PATENT DOCUMENTS

| | | | |
|---|---|---|---|
| 3,399,374 | 8/1968 | Pauza et al. | 439/680 X |
| 4,673,912 | 6/1987 | Kumasaka et al. | 340/438 X |
| 4,849,743 | 7/1989 | Ohno | 340/687 |

FOREIGN PATENT DOCUMENTS 61-71556 5/1986 Japan .

Primary Examiner—A. D. Pellinen
Assistant Examiner—David Osborn
Attorney, Agent, or Firm—Wenderoth, Lind & Ponack

[57] ABSTRACT

An electric connecting device which is arranged midway of a signal line which issues signals to a plurality of electrical appliances. This electric connecting device includes a combination of a plurality of connectors and a connector joining member having a plurality of connector joining parts which are joined electrically to each of the connectors. If at least one of the connectors is not joined normally, the joining of the remaining connectors is regulated by a regulating device which prevents the remaining connectors from being joined to the connector joining member. With the device it is possible to call the attention of an operator to any abnormal joining and to effect the joining of each connector accurately. By making one of the signal lines an airbag circuit for actuating an inflator in an airbag device of a vehicle and making the other of the signal lines a signal line for detecting the abnormality of the inflator and a collision sensor and a horn circuit for tooting a horn, these electrical appliances are connected electrically and accurately and the reliability thereof is improved.

25 Claims, 9 Drawing Sheets

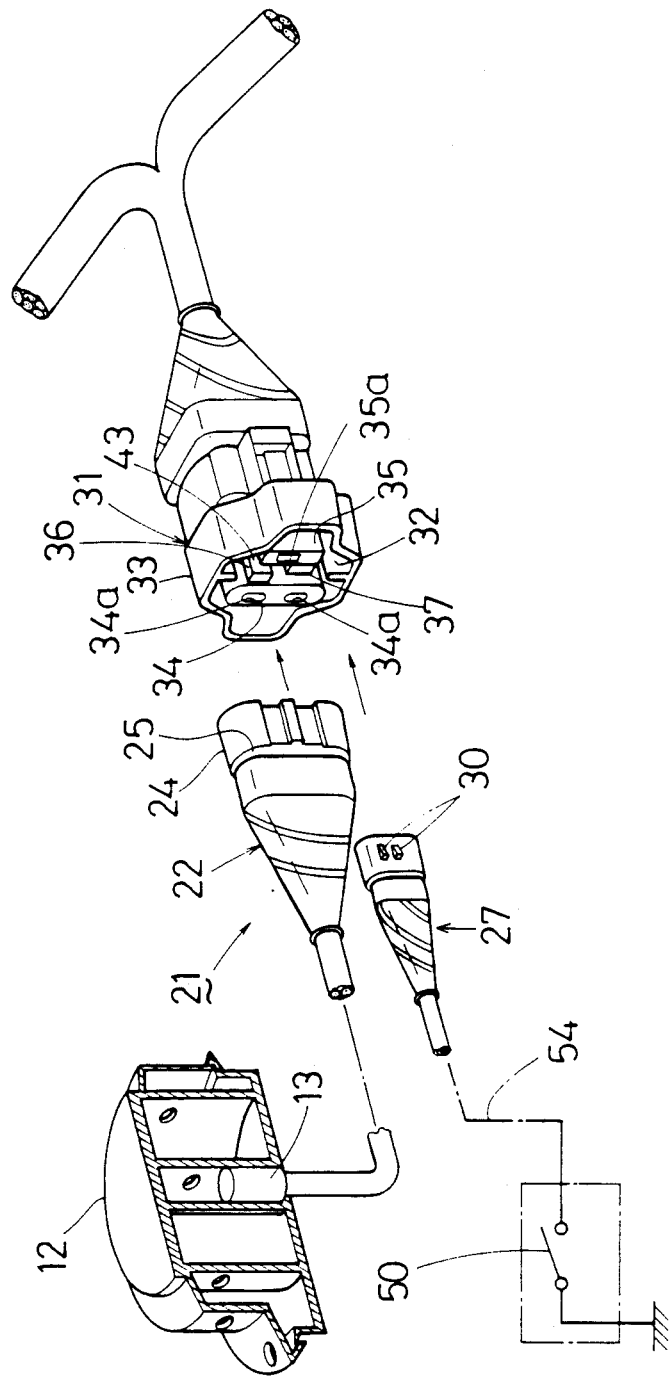

ELECTRIC CONNECTING DEVICE

BACKGROUND OF THE INVENTION

1. Field of the Invention:

This invention relates to an electric connecting device arranged midway of a signal line which puts out signals to various electrical appliances, for connecting said line in a continued state electrically, and particularly for ensuring an accurate electrical connection.

2. Description of the Prior Art:

An airbag device for protecting men in a vehicle from the impact during a head-on collision is conventionally known. This airbag device, as disclosed in Japanese Utility Model Laid-Open Publication No. 61-71556, for example, is provided with an airbag arranged in front of seats, an inflator for inflating the airbag by filling the airbag with a gaseous body by ignition and a collision sensor for detecting the collision of vehicles. At the time of the collision of vehicles, a battery (power source) in the car supplies power to the inflator, whereby the inflator is ignited and the airbag is inflated. Thus, men in the car are prevented from colliding with a front windshield, a steering wheel, etc.

In order to ensure a normal operation of a system, the conventional airbag device is equipped with a trouble diagnosing device whereby the outbreak of any abnormal continuity in a main circuit is indicated to a man in the vehicle so that an immediate repair can be made. This trouble diagnosing device is so designed that a main circuit connects a collision sensor and an inflator to a battery, electric potential at a specified part of the main circuit is led to a potential detecting part by a sub-circuit and an abnormal continuity, such as breaking, a short-circuit, etc., of the main circuit is detected at the potential detecting part as a potential change in the main circuit.

In the case where a sensor side and a battery side in the main circuit are connected electrically and in the case where a joining part to the main circuit and the potential detecting part in the sub-circuit are connected electrically, an electric connecting device which comprises a combination of a connector and a connector joining member having a connector joining part which joins said connector is generally used. By the connection of the connector joining member and the connector, the desired electrical connection is obtained.

However, due to the carelessness of an operator and other causes, it sometimes happens that the connector is not connected normally and accurately to the connector joining part of the connector joining member. In such a case, the main circuit assumes a broken state at the electric connecting device and therefore the airbag device cannot perform its function accurately.

The present invention has been made in view of the above-mentioned drawbacks of the conventional device.

BACKGROUND OF THE INVENTION

An object of the present invention is to provide an electric connecting device for connecting plural signal lines of main circuit with a sub-circuit in a continuous state comprising connectors and a connector joining member, characterized in that the completeness of a connection of one connector to a connector joining member is judged on the basis of the state in which the other connector is joined to the connector joining member, thereby enabling mutual discrimination of an incomplete joining state of each connector and thus allowing each connector to be joined to a connector joining member accurately.

Another object of the present invention is to provide an electric connecting device wherein a non-continuous state of a signal line caused by an imperfect joining of one connector to the connector joining member can be determined from an imperfect connection of the other connector and also from the non-continuous state of a signal line resulting from the imperfect connection of said other connector.

A further object of the present invention is to provide an electric connecting device whereby the operability of an airbag device for a vehicle can be maintained in a constantly stabilized condition by effecting a continuous connection of an inflator, a collision sensor and a power source in an airbag circuit.

In order to attain the above objects, in the present invention the first signal lines which issue operation signals to specified electrical appliances and the second signal lines which issue operation signals to electrical appliances other than the foregoing electrical appliances are put in a continued state respectively and independently by an electric connecting device, and such an electric connecting device is composed of a first connector, a second connector and a connector joining member which is connected to both connectors. A housing is provided for said connector joining member. Provided in this housing are a first connector fitting part which is connected electrically to said first connector and puts said first connector in a continued state and a second connector fitting part which is connected electrically to said second connector and puts said second connector in a continued state. Provided further in the housing is a fitting regulating means which regulates the fitting of the second connector into the second connector fitting part in the case where the first connector is not fitted normally in the first connector fitting part.

In the above case, the first fitting signal lines may comprise main circuits for operating electrical appliances and the second signal lines may comprise sub-circuits which check the continued state of the main circuits. The main circuits and the sub-circuits are placed in a continuous state independently by an electric connecting device which is composed of a main connector, a sub-connector and a connector joining member connected to both connectors. Similar to the structure mentioned above, provided in the housing of the connector joining member are a main connector fitting part which is connected electrically to the main connector and puts the main circuit in a continued state, a sub-connector fitting part which is connected electrically to the sub-connector and puts the sub-circuit in a continued state, and a fitting regulating means which regulates the fitting of the sub-connector fitting part in the case where the main connector is not fitted normally in the main connector fitting part.

Also, the main circuit may comprise an airbag circuit which actuates an airbag device at the time of a collision of vehicles. This airbag circuit has a power source, a sensor for detecting the collision of vehicles, an inflator for inflating the airbag by filling the same with a gaseous body and a harness for connecting associated electrical appliances. A connector is provided at least one of the connecting parts of each electrical appliance and a harness. Further, the sensor is of switch type and is connected with two power source lines and two trouble diagnosing lines, of which at least two power source lines are connected to the main connector and at least one trouble diagnosing line is connected to the sub-connector.

The second signal line is connected to an alarm device which issues an abnormality alarm if the second connector is not fitted in the second connector fitting part of the connector joining member. By this connection to the alarm device, an improper fitting of the second connector in the connector joining member can be found out by an abnormality alarm of the alarm device and this will promote a normal connection of the first connector. If the second signal line is made to facilitate checking of the continuous state of the first signal line, any abnormal continuity of the first signal line can be detected earlier and as a result, earlier repair can be done.

Because the first signal line may comprise an airbag circuit for actuating an airbag device at the time of a collision of vehicles, it is possible to put the airbag circuit in a continuous state accurately and to ensure the reliability of the airbag device. In this case, if the second signal line comprises a horn circuit for tooting a vehicle horn, the failure of the horn to toot is indicative of a non-continuous state of the airbag circuit and as a result, a more accurate continuity of the airbag circuit can be obtained.

Specifically, the above airbag circuit has a power source, a sensor for detecting collision of vehicles, an inflator for inflating the airbag by filling the same with a gaseous body and a harness for connecting these electrical appliances. A connector is provided at least at one of the parts where each electrical appliance is connected to the harness.

Structurally, the electric connecting device comprises a first member and a second member to be connected to said first member. While a plurality of connector joining parts are provided at one of the first and the second members, the other is composed of a plurality of independent connectors which are connected to each of the foregoing connector joining parts. When at least one of the plurality of connectors is not connected normally to the connector joining part, a joining regulator means regulates the joining of the remaining connectors to the connector joining part.

In the above case, the connector joining part comprises a first connector joining part and a second connector joining part. The joining regulating means is composed of a movable member which is provided movably between both connector joining parts. This movable member is so designed that it is positioned in front of the second connector joining part when a connector is not connected to the first connector joining part.

The above movable member is composed of a swingable plate with its intermediate part supported swingably about a support axis. One end of this swingable plate is positioned in front of the second connector joining part and the other end is connectable, when a connector is connected to the first connector joining part, to the connector.

A regulating plate is provided to the side of the swingable plate. One end of this regulating plate is fixed between the first and the second connector joining parts and at the other end is provided protruding fitting part which makes contact with a connector which was imperfectly joined to the first connector joining part. By the contact of this joining part with the connector, the other end of the regulating plate is moved in front of the second connector joining part.

A tapered part which makes contact with a connector to be joined to the first connector joining part is formed above the regulating plate or the regulating plate is made of flexible material. In this case, when joining a connector to the first connector joining part, the other end of the regulating plate can be moved easily to a position in front of the second connector joining part and therefore the joining of a connector to the first connector joining part and movement of the regulating plate can be carried out smoothly.

A spring which forces one end of the swingable plate to a position in front of the second connector joining part is provided about a support axis of the swingable plate. Under this arrangement, while a connector is not joined to the first connector joining part, one end of the swingable plate is always positioned in front of the second connector joining part and thus a connector is prevented from being joined independently to the second connector joining part.

BRIEF DESCRIPTION OF THE DRAWINGS

The nature and advantages of the present invention will be understood more clearly from the following description of embodiments of the present invention made with reference to the accompanying drawings, in which:

FIG. 1–FIG. 8 show a first embodiment of the present invention, in which:

FIG. 1 is a cross-sectional view of an electric connecting device;

FIG. 2 is a perspective view of the electric connecting device in a disassembled state.

FIG. 3 is a general perspective view of a connector joining member;

FIG. 5 is an electric circuit diagram for an airbag device;

FIG. 6 is an electric circuit diagram, showing the state of joining of a main circuit and a sub-circuit in a front sensor;

FIG. 7 is a flow chart, showing a sequence of signal processes for detecting an abnormality in an inflator with a trouble diagnosing module;

FIG. 8 is a perspective view, showing the mounting position of each electrical appliance of an airbag device in a car;

FIG. 9–FIG. 11 show, respectively, another embodiment of the present invention, in which:

FIG. 9 is a perspective view of an electric connecting device in a disassembled state;

FIG. 10 is an electric circuit diagram for an airbag device; and

FIG. 11 is an electric circuit diagram, showing the state of connection of a main circuit and a sub-circuit in an inflator.

DETAILED DESCRIPTION OF THE PRESENT INVENTION

Embodiments of the present invention are described below with reference to the accompanying drawings.

Figure 6:
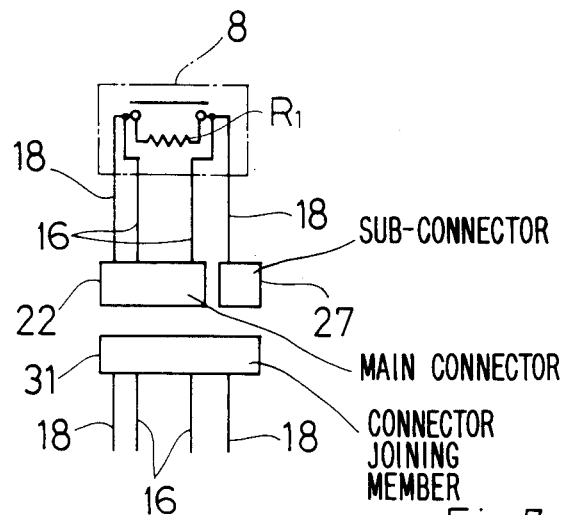
Figure 7:
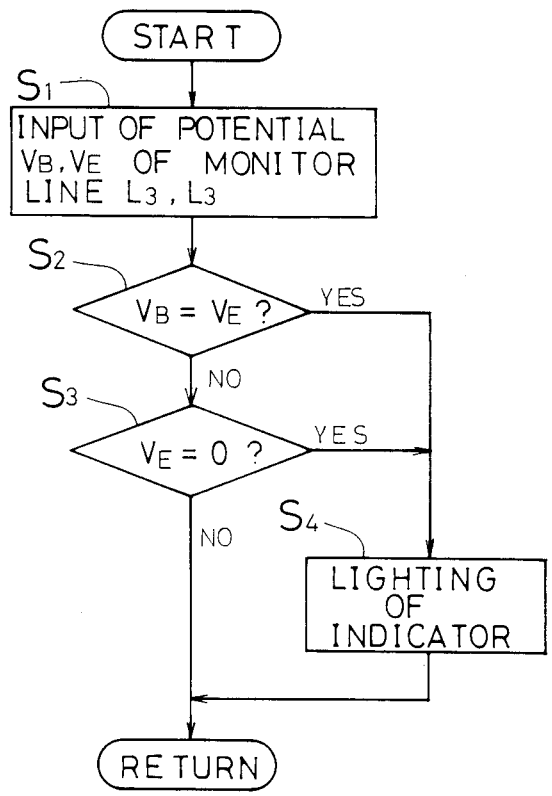
Figure 8:
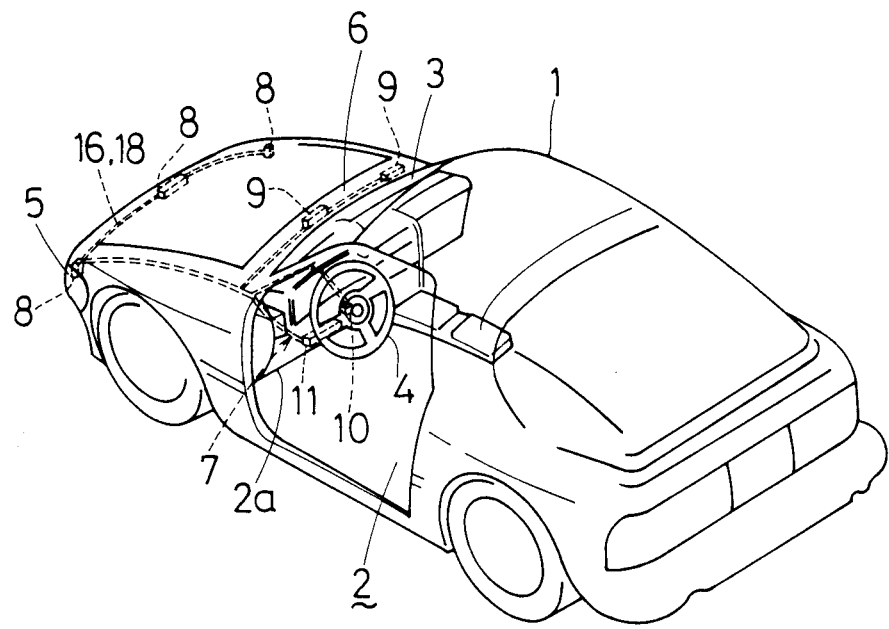

FIG. 1–FIG. 8 show an embodiment of the present invention. In FIG. 8, reference numeral 1 designates a car body and reference numeral 2 designates a passenger compartment in the car body 1. Provided in the car body 1 is an airbag device 7 which at the time of head-on collision of a car prevents a man (men) in the car room 2 from colliding with a front windshield 3, a steering wheel 4 or the like. This airbag device 7 is provided with three front sensors 8, 8, 8 incorporated in a front bumper 5 at both ends and a central portion thereof, a pair of cowl sensors 9, 9 fitted in both ends of a cowl part 6 of the car body 1, an airbag module 10 arranged unrevolvably at the central part of the steering wheel 4 and a trouble diagnosing module 11 incorporating a CPU fitted to an instrument panel 2a and the front end of the passenger compartment 2. These apparatuses are connected with one another by a main circuit 16 and a sub-circuit 18. The front sensor 8 and the cowl sensor 9 are of a switch type. The internal construction of these sensors 8, 9 is not shown in the drawings but each of them comprises, for example, a pair of contacts and a sensing mass which short-circuits both of the contacts. Normally, the sensing mass is kept separated from the contacts by a magnet ("OFF" state) but at the time of collision, the sensing mass assumes an "ON" operation state by moving, under the abnormal acceleration resulting from a collision, into contact with the contacts.

Figure 5:
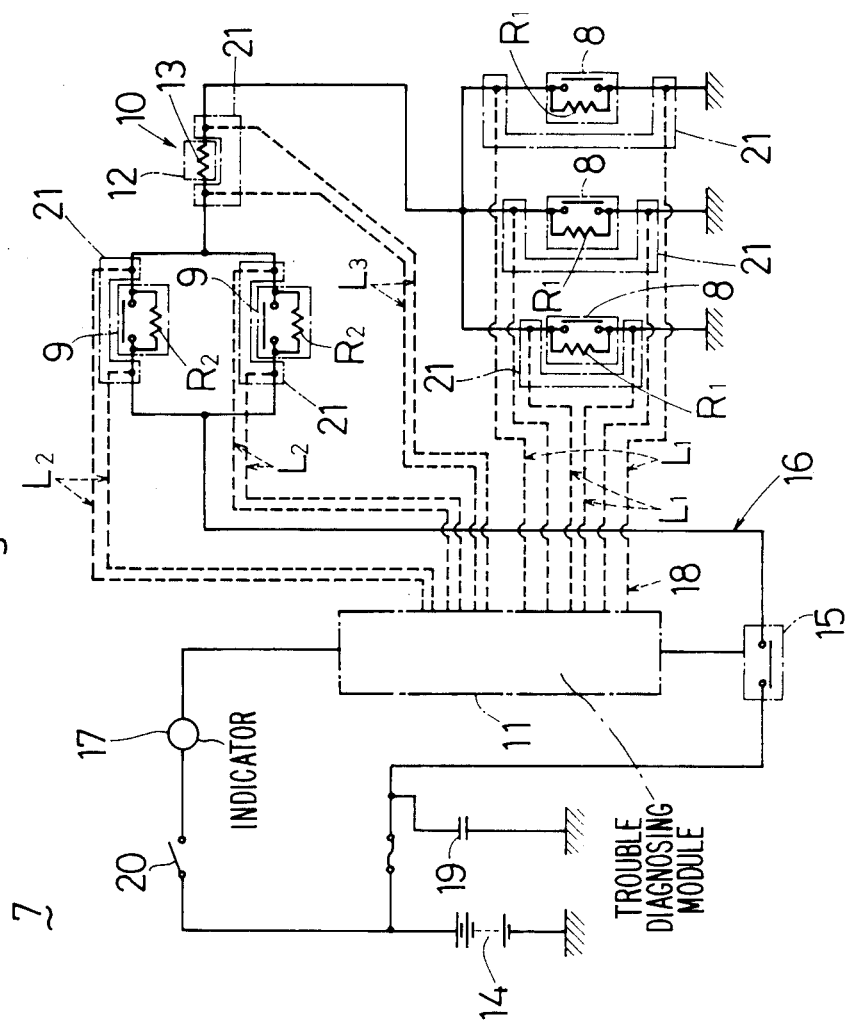

As shown in FIG. 5, each of the three front sensor 8, 8, 8 is connected in series to the airbag module 10. This airbag module 10 is provided with an airbag (not shown in the drawings), an inflator 12 which fills the airbag with a gaseous body to inflate it and an igniter 13 comprising a heater which actuates the inflator 12. Each of the front sensors 8 is connected to this igniter 13. A pair of cowl sensors 9, 9 is connected in series with the igniter 13. Each of the cowl sensors 9, 9 is connected to a battery 14 in the car via a system down switch 15 which is normally "ON" for keeping the airbag device in a non-operation state. The main circuit 16 is composed of circuits which connect in series the front sensors 8, 8, 8, the inflator 12, cowl sensors 9, 9, the system down switch 15 and the battery 14. When one of the three front sensors 8, 8, 8 turns "ON" and one of the two cowl sensors 9, 9 turns "ON" at the time of a head-on collision of a car, power is supplied from the battery 14 to the igniter 13 of the inflator 12 to make the igniter 13 generate heat. By the generation of heat of the igniter 13, the inflator 12 is actuated to inflate the airbag.

Incorporated in each front sensor 8 and each cowl sensor 9 is a resistance $R_1$ and a resistance $R_2$, respectively, which are connected in parallel with respective contact alignment. As shown by broken lines in FIG. 5, the main circuit 16 on both sides of each sensor 8 and each sensor 9 (contacts and resistance $R_1$, $R_2$ in parallel therewith) is connected with a pair of monitor lines $L_1$, $L_1$ and a pair of monitor lines $L_2$, $L_2$ for monitoring the short-circuit of each sensor 8 and each sensor 9. A pair of monitor lines $L_3$, $L_3$ for monitoring the disconnection of the igniter 13 are connected between the contacts of the igniter 13 in the inflator 12. Each of these monitor lines $L_1$-$L_3$ is connected to the trouble diagnosing module 11. The trouble diagnosing module 11 has the function of controlling ON/OFF state of the system down switch 15 and is connected to the battery 14 via an indicator 17 as an alarm device. The alarm device can be a buzzer instead of the indicator 17.

In a trouble diagnosing module 11, when a short-circuit of each sensor 8 and each sensor 9 is detecting, a very low current for monitoring is kept applied to each sensor 8 and each sensor 9 through the monitor lines $L_1$, $L_2$ and, if the electric current values of the monitor lines $L_1$, $L_2$ increase over a set value, it is concluded that such increases were caused by a short-circuiting of the sensors 8, 9. Accordingly, the main circuit 16 is broken by OFF operating the system down switch 15. At the same time, such an abnormality is indicated to a man in the car by the indicator 17.

When detecting the abnormality of the inflator 12, a signal process shown by the flow chart of FIG. 7 is done. Concretely specifically, at the step $S_1$ the potential $V_B$ on battery side and the potential $V_E$ on the ground side of the inflator 12 are inputted by both monitor lines $L_3$, $L_3$. Then, at the step $S_2$ it is judged whether the potential $V_B$ and the potential $V_E$ are equal to each other. If the inflator 12 short-circuits, the result is $V_B = V_E$ and the judgement is "YES". In this case, the process advances to the step $S_4$ and the indicator 17 is lighted. On the other hand, if no short-circuit of the inflator 12 is found and the judgement at the step $S_2$ is "NO", the process advances to the step $S_3$ and it is judged whether the potential $V_E$ on earth side is zero. If the inflator 12 is disconnected, the result is $V_E = 0$ and the judgement is "YES". In this case, the process advances to the step $S_4$ and the indicator 17 is lighted. If the inflator 12 is not broken and the judgement at the step $S_3$ is "NO", the process terminates.

In this embodiment, the sub-circuit 18 for checking the continuity state of the main circuit 16 comprises each monitor line $L_1$, $L_2$, $L_3$. In FIG. 5, reference numeral 19 designates a condenser which acts as an auxiliary power source, when the battery 14 is disabled, to supply power. Reference numeral 20 designates an operation switch for the supply of power to the trouble diagnosing module 11.

The above-mentioned electrical appliances are connected to one another by the main circuit 16, the sub-circuit 18 and the harness forming the monitor lines $L_1$-$L_3$. Provided for the main circuit 16 and the sub-circuit 18 near each sensor 8, each sensor 9 and the inflator 12 are electric connecting devices 21, 21, . . . , each of which puts the main circuits 16, 16 and sub-circuits 18, 18 in the continuity state respectively and independently. These electric connecting devices 21, 21, . . . have the same structure. The electric connecting device near the front sensor 8 is described below.

Figure 1:
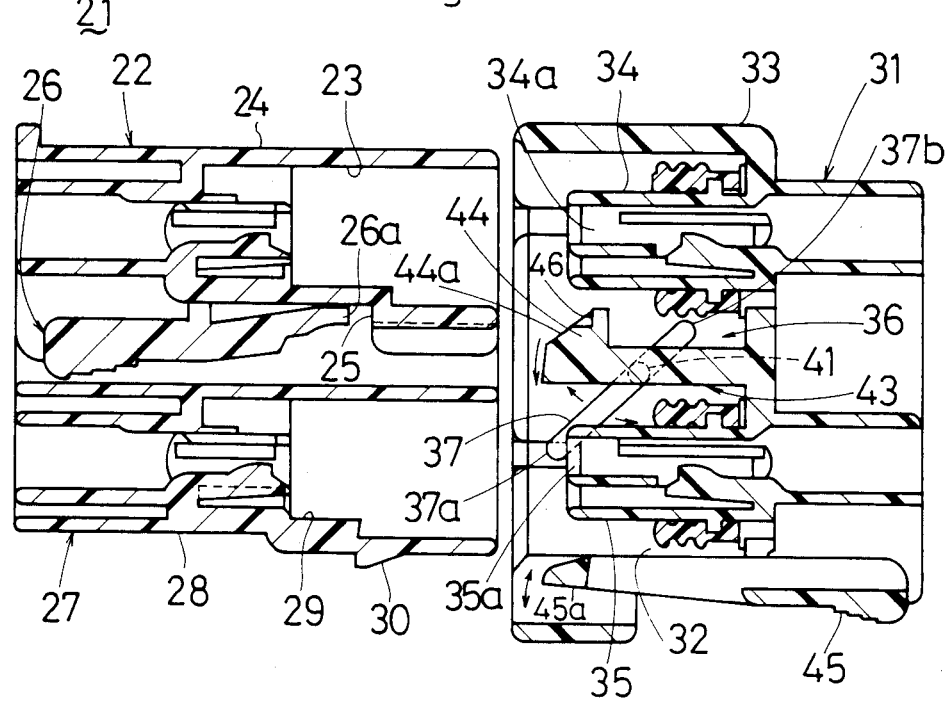
Figure 2:
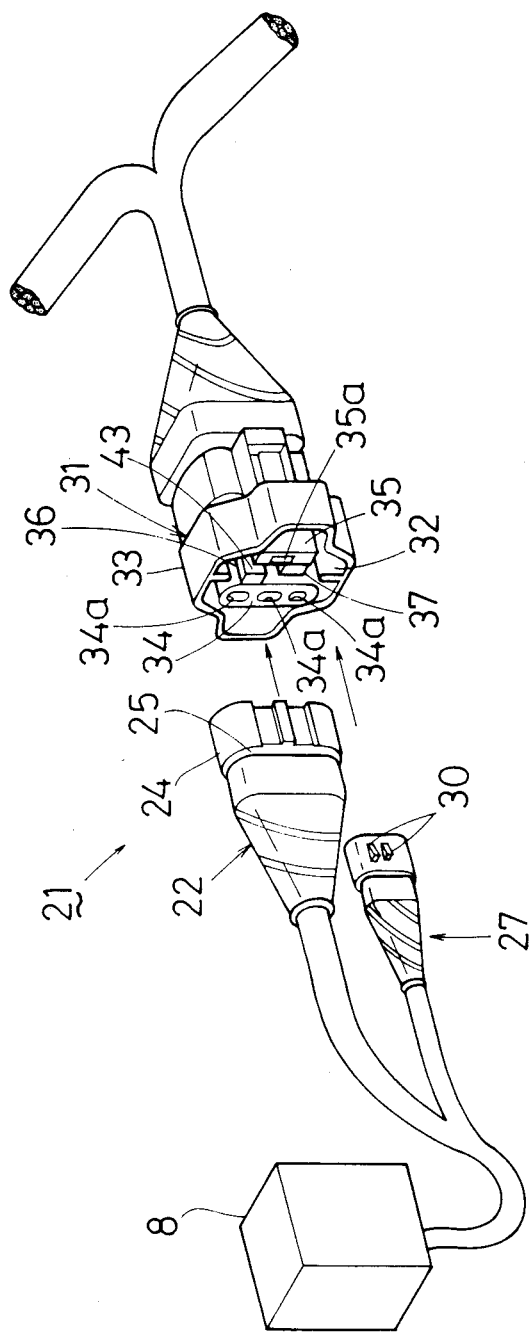

As shown in FIG. 6, the electric connecting device 21 comprises a main connector 22, a sub-connector 27 and a connector joining member 31 to be connected to said connectors 22, 27. The main connector 22 forms one of the main circuits 16, 16 on the sensor 8 side and the sub-circuit 18, 18 on the sensor 8 side (one of the monitor lines $L_1$). The sub-connector 27 forms the other of the sub-circuits 18, 18 (the other of the monitor lines $L_1$). The connector joining member 31 forms the main circuits 16, 16 and the sub-circuits 18, 18 on the car body side. As shown in FIG. 1 and FIG. 2, the main connector 22 has a housing 24 with a hollow part 23 formed at its top part. Three pins (not shown in the drawing) project form the bottom surface of the hollow part 23. A front end (top end) of the housing 24 has a larger diameter than the rear end and a shoulder part 25 is formed at the rear of the larger diameter part (on the left side in the drawing) along one portion of the outer circumference of the housing 24. Provided swingably in the housing 24 and to the rear of the shoulder part 25 is a lever 26. This lever 26 is supported by the housing 24 as biased in a counterclockwise direction so that its top end contacts the outer circumference of the housing. An engaging part 26a is formed at the top end portion of the lever 26.

Basically, the sub-connector 27 has a structure similar to that of the main connector 22, namely, a hollow part 29 is formed at the end portion of the housing 28 and one pin (not shown in the drawing) projects from the bottom surface of the hollow part 29. Also, projections 30, 30 protrude from one portion of the outer circumference of the housing 28 and at the larger diameter part of the housing 28.

The connector joining member 31 is provided with a housing 33. This housing 33 has a bottom hollow part 32 in which both connectors 22, 27 can be fitted. A main connector fitting part 34 which can be fitted in the hollow part 23 of the main connector 22 protrudes from one part of the bottom surface of the hollow part 32. Three pin holes 34a, 34a, 34a are defined at a forward end surface (top end surface) of the connector fitting part 34. A contact (not shown in the drawing) which is connectible to each pin of the main connector 22 is provided in each of the pin holes 34a. The pin of the main connector 22 is connected electrically to the contact of the main connector fitting part 34 by fitting the main connector 22 in one side of the hollow part 32 upon fitting the main connector fitting part 34 in the hollow part 23, whereby main circuits 16, 16 on the sensor 8 side and the car body side and one side of the sub-circuit 18, 18 on the sensor 8 side and the car body side (one side of the monitor lines $L_1$) are put in a continuous state.

On the other hand, at the other side of the bottom surface of the hollow part 32, a sub-connector fitting part 35 which can be fitted in the hollow part 29 of the sub-connector 27 protrudes side by side with the main connector fitting part 34, with a certain space left therebetween. One pin hole 35a is formed at a front end of the sub-connector fitting part 35. A contact (not shown in the drawing) which is connectible to the pin of the sub-connector 27 is provided in the pin hole 35a. The pin of the sub-connector 27 is connected electrically to the contact of the sub-connector fitting part 35 by fitting the sub-connector 27 in the other side of the hollow part 32 upon fitting the sub-connector fitting part 35 in the hollow part 29, whereby the other side of the sub-circuit 18, 18 (the other side of the monitor lines $L_1$) are put in a continuous state.

Figure 3:
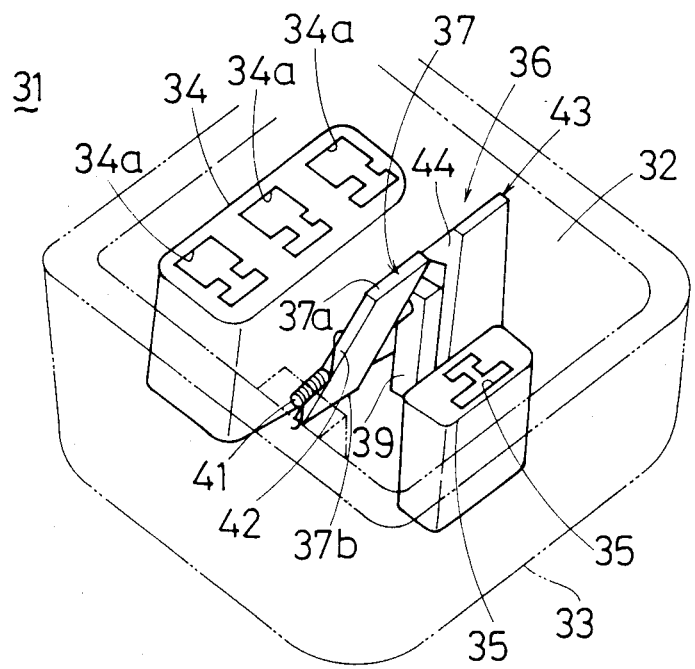
Figure 4A:
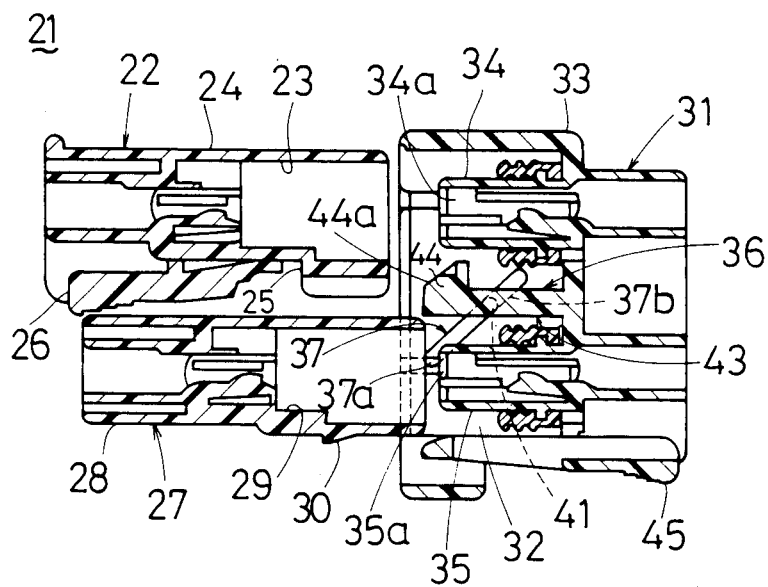
FIG. 4(a)–4(d) are cross-sectional views of the electric connecting device showing the state of connection of each connector to a connector joining member.
Figure 4B:
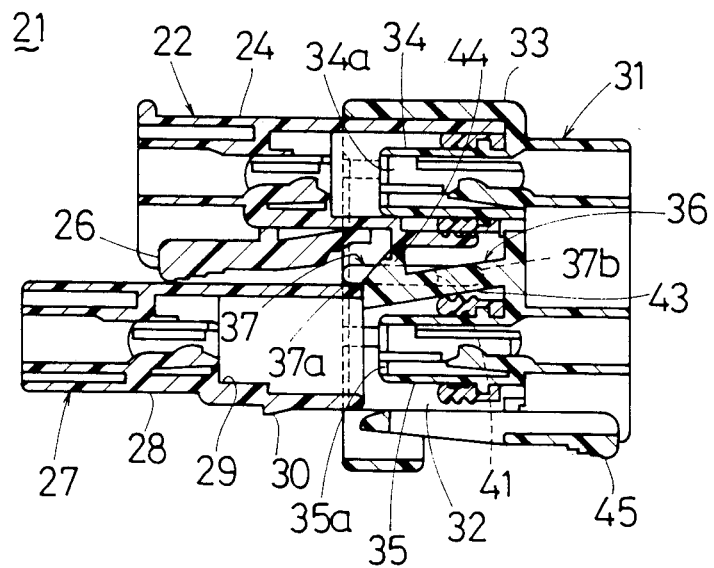

Provided between both connector fitting parts 34, 35 in the hollow part 32 is a fitting regulating mechanism 36 which regulates the fitting of the sub-connector 27 in the sub-connector fitting part 35 when the main connector 22 is not fitted normally in the main connector fitting part 34. As shown in FIG. 3, this fitting regulating mechanism 36 basically comprises a swingable plate 37 positioned at one side between connector fitting parts 34, 35 and a flexible plate 43 positioned at the other side between connector fitting parts 34, 35. The swingable plate 37 is supported swingably at its intermediate part through the medium of an axial support 41, which is mounted between a side wall of the hollow part 32 and a top end portion of a bearing part 39 protruding from the bottom surface of the hollow part 32. Arranged around the axial support 41 is a spring 42 which forces the swingable plate 37 to turn in the anticlockwise direction in FIG. 1. As shown in FIG. 4(a), in the state where the main connector 22 is not fitted at all in the main connector fitting part 34, the swingable plate 37 is inclined by the force of the spring 42 so that its end portion 37a on the entrance side is positioned in front of the sub-connector fitting part 35 and its end portion 37b on the interior side is positioned in a space defined at one side of the main connector fitting part 34. Thus, the fitting of the sub-connector 27 in the sub-connector fitting part 35 is checked by the end portion 37a on the entrance side. On the other hand, as shown in FIG. 4(b), if the main connector 22 is fitted in the main connector fitting part 34 in an imperfect semi-fitted state (the state in which the pin on the connector 22 side and the contact on the connector fitting member 31 side do not make accurate contact electrically), the swingable plate 37 is turned the clockwise direction in FIG. 1 against the force of the spring 42 in such a fashion that its end portion 37a on the entrance side is shifted from the position in front of the sub-connector fitting part 35 due to the main connector 22 pressing the end portion 37b on the entrance side of the swingable plate 27, whereby the checking of the fitting of the sub-connector 27 in the sub-connector fitting part 35 by the end portion 37a on the entrance side is released.

Figure 4C:
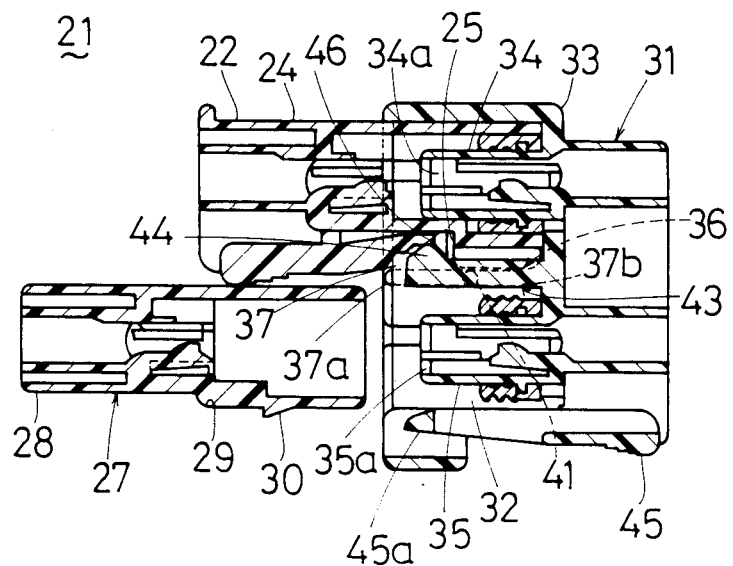
Figure 4D:
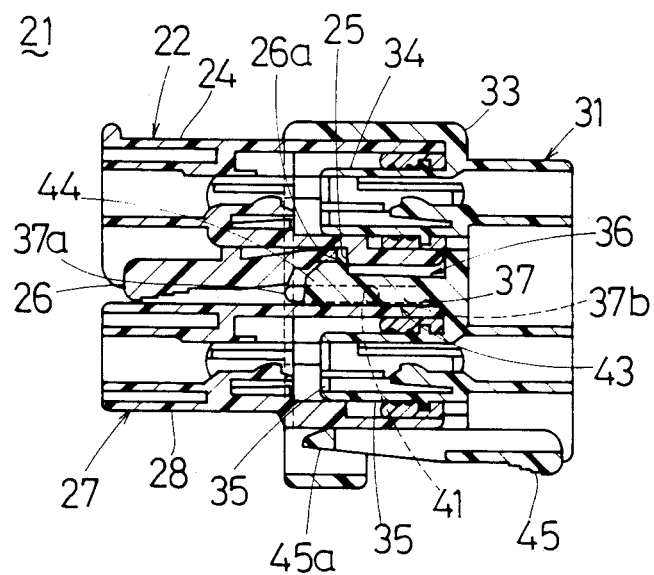

The flexible plate 43 is provided tiltably at the bottom surface of the hollow part 32. A top end (end portion on the entrance side) of the flexible plate 43 extends toward the open end of the hollow part 32. Protruding from a top end of the flexible plate 43 and at the side of the main connector fitting part 34 is an engaging protrusion 44 which is engageable with the shoulder part 25 of the main connector 22. Defined at a top end of the engaging protrusion 44 is a tapered part 44a which makes contact with the main connector 22 fitted the main connector fitting part 34. In the semi-fitted in state of the main connector 22 mentioned above, as shown in FIG. 4(b), the main connector 22 presses the tapered part 44a of the engaging protrusion 44 of the flexible plate 43 and bends the flexible plate 43 in such a fashion that its top end is positioned in front of the sub-connector fitting part 35. By the bent top end of the flexible plate 43, the sub-connector 27 is prevented from fitting any further in the sub-connector fitting part 35. On the other hand, in the perfectly fitted state of the main connector (the state in which the pin on the main connector 22 side and the contact on the connector fitting member 31 side make accurate contact electrically), as shown in FIG. 4(c), the engaging shoulder part 25 of the main connector 22 in engaged with the engaging protrusion 44 of the flexible plate 43 and the main connector 22 is fitted in and supported by the main connector fitting part 34 unremovably. At the same time, pressure on the engaging protrusion 44 by the main connector 22 is released, whereupon the flexible plate 43 is restored to its original state from the position in front of the sub-connector fitting part 35 and the checking of the fitting of the sub-connector 27 in the sub-connector fitting part 35 is released.

Thus, when the sub-connector 27 of the electric connecting device 21 is not fitted in the sub-connector fitting part 35 of the connector fitting member 31, the sub-circuit 18 is regarded as being disconnected and an abnormality alarm is issued as the lighting of the indicator 17.

At the outer circumference of the housing 33 of the connector fitting member 31 is supported an engaging lever 45 which extends in a longitudinal direction in such a fashion that it is swingable and its top end portion is forced to make contact with the outer circumference of the housing 33. At a top end portion of the engaging lever 45 is formed an engaging part 45a which is engageable with the projection 30. When the sub-connector 27 is, the projection 30 is engaged with the engaging part 45a at the top end of the engaging lever 45 and the sub-connector 27 is fitted in and supported by the sub-connector fitting part 35 unremovably. In this state, if a rear end portion of the engaging lever 45 is pressed and the lever 45 is turned in the anticlockwise direction in FIG. 1, the engaging part 45a is disengaged from the projection 30 and the sub-connector 27 is removable from the sub-connector fitting part 35.

Formed at a top end surface of the engaging protrusion 44 of the flexible plate 43 is an engaging part 46 which is engageable with the engaging part 26a at the top end of the engaging releasing lever 26 of the main connector 22. When the main connector 22 alone is fitted to the connector joining member 31, the engaging part 26a is engaged with the engaging part 46. In this state, if a rear end portion of the engaging releasing lever 26 is pressed and the lever 26 is turned in the counterclockwise direction in FIG. 1, the engaging part 26a bends the flexible plate 43 in such a fashion that its top end moves toward the top end side of the sub-connector fitting part 35, whereupon the engaging protrusion 44 is disengaged from the engaging shoulder part 25 and the main connector 22 is made removable from the main connector fitting part 34.

The operation of the foregoing embodiment is described below.

In the airbag device 7, when at least one of the front sensors 8, 8 . . . and at least one of the dash sensors 9, 9 assumes an ON operation state as a result of the head-on collision of vehicles, power from the battery 14 is supplied to the igniter 13 of the inflator 12 and the igniter 13 generates heat. By the generation of heat of the igniter 13, the inflator 12 is actuated and the airbag is filled with a gaseous body and inflates. By the inflation of the airbag, men in the car are prevented from colliding with a steering wheel 4, a front windshield 3, etc. and thus safely is ensured.

In a normal state, when electric current flowing through each sensor 8, 9 increases, such an abnormality is detected by the trouble diagnosing module 11 and each sensor 8, 9 which shows an increase of electric current is determined to be in a "short-circuited state" by the trouble diagnosing module 11 and the system down switch 15 is switched to an "OFF" state and the main circuit 16 is broken. Thus, the abnormality in which the airbag inflates without the collision of vehicles can be avoided. On the other hand, if potential $V_B$ and potential $V_E$ at both terminals of the igniter 13 are inputted in the trouble diagnosing module 11 and both potentials $V_B$ and $V_E$ are equal to each other, the inflator 12 is determined to be in a "short-circuited state". If potential $V_E$ on the battery side is zero, the inflator 12 is determined to be in a "broken state". When such short-circuit and breakage of the inflator 12 detected and when each sensor 8, 9 is found to be short-circuited, the indicator 17 is lighted and thus, such an abnormality in the system is informed to a man in the car.

Each sensor 8, 9 and the igniter 13 are connected electrically to the battery 14 and the trouble diagnosing module 11 by the electric connecting devices 21, 21. . . . In each electric connecting device 21, by connecting of the main connector 22 and the sub-connector 27 of the main connector fitting part 34 and the sub-connector fitting part 35, respectively, of the connector joining member 31, an electrically connected state is established. Connecting action is explained below on the basis of FIG. 4.

1. The main connector 22 is fitted in the connector fitting part 34 of the connector joining member 31. In this case, as shown in FIG. 4(a), in the state where the main connector 22 is not fitted at all in the main connector fitting part 34 (unfitted state) the swingable plate 37 slants so that its end portion 37a on the entrance side is positioned in front of the sub-connector fitting part 35 and at its end portion 37b on the interior side is positioned in a space defined to the side of the main connector fitting part 34. Therefore, even if one tries to fit the sub-connector 27 into the sub-connector fitting part 35 by mistake, such fitting of the sub-connector 27 into the sub-connector fitting part 35 is restrained by the end portion 37a of the swingable plate 37. As a result, the unfitted state of the main connector 22 can be found out by such unfittable state of the sub-connector 27. In this case, since the swingable plate 37 is forced to turn by the spring 42, when the main connector, 22 is not connected the end portion 37a on the entrance side is always positioned in front of the sub-connector fitting part 35 and therefore the sub-connector 27 can be prevented from being connected earlier than the main connector 22.

2. If the main connector 22 is fitted partially in the main connector fitting part 34, as shown in FIG. 4(b) the end portion 37b on the interior side of the swingable plate 37 is pressed by the main connector 22 and the swingable plate 37 turns in a clockwise direction against the force of the spring 42, whereupon the end portion 37a on the entrance side is shifted from the position in front of the sub-connector fitting part 35. Consequently, a checking of the fitting of the sub-connector 27 in the sub-connector fitting part 35 by the end portion 37a on the entrance side is released.

However, if the fitted-in state of the main connector 22 is a semi-fitted in state (a state in which the pin on the main connector 22 side and the contact on the connector joining member 31 side do not make accurate contact electrically), the tapered part 44a of the engaging protrusion 44 of the flexible plate 43 is pressed by the main connector 22 and the flexible plate 43 tilts, whereupon its top end moves toward the front of the sub-connector fitting part 35. Therefore, even if one tries to inert the sub-connector 27, following the partial insertion of the main connector 22, such insertion is checked by the top end of the flexible plate 43. As a result, the semi-fitted in state of the main connector 22 can be found by such unfittable state of the sub-connector 27. In this case, since the flexible plate 43 has flexibility and its top portion which makes contact with the main connector 22 is a tapered part 44a, tilting of the flexible plate 43 and fitting-in of the main connector 22 can be done smoothly.

3. In the state where the main connector 22 is completely fitted in (the pin of the main connector 22 and the contact on the connector joining member 31 side make accurate contact electrically), as shown in FIG. 4(c), the shoulder part 25 of the main connector 22 is engaged with the engaging protrusion 44 of the flexible plate 43. In this state, pressure on the engaging protrusion 44 of the flexible plate 43 by the main connector 22 is released and the flexible plate returns to its original straight state and its top end is shifted from the position in front of the sub-connector fitting part 35, whereupon a checking of the fitting of the sub-connector 27 by the flexible plate 43 is released. As a result, as shown in FIG. 4(b), the sub-connector 27 can be fitted and therefore both connectors 22, 27 can be fitted perfectly and are connected electrically with the connector joining member 31.

In the state where both connectors 22, 27 are perfectly fitted, the main connector 22 is supported unremovably by the main connector fitting part 34. As the engaging convex part 30 engages the engaging part 45a at the top end of the engaging lower 45 in the connector joining member 31, the sub-connector 27 is fitted in and supported unremovably by the sub-connector fitting part 35. Thus, both connectors 22, 27 are connected inseparably to the connector joining member 31.

4. When each connector 22, 27 is detached from the connector joining member 31, firstly a rear end portion of the engaging lever 45 is pressed and the lever 45 is turned in the counterclockwise direction in FIG. 1, whereupon the engaging part 45a at the top end of the lever 45 is disengaged from the convex part 30. By this disengagement, it becomes possible to detach the sub-connector 27 from the sub-connector fitting part 35. After the sub-connector 27 was detached, a rear end portion of the engaging releasing lever 26 is pressed and the lever 26 is turned in the counterclockwise direction in FIG. 1, whereupon the flexible plate 43 is bent by the engaging part 26a in such a fashion that its top end is moved to the front of the sub-connector fitting part 35 and the engaging protrusion 44 is disengaged from the shoulder part 25. By this disengagement, the main connector 22 can be detached from the main connector fitting part 34.

In this embodiment, when the main connector 22 is not fitted normally in the main connector fitting part 34 of the connector joining member 31 (unfitted state or semi-fitted state), the fitting of the sub-connector 27 into the sub-connector fitting part 35 is restrained and therefore the improper fit of the main connector 22 can be found instantly owing to the unfittable state of the sub-connector 27. By this finding, the main connector 27 can be joined to the connector joining member 31 accurately and electrically.

Since the sub-circuit 18 is connected to the indicator 17 via the trouble diagnosing module 11, when the sub-connector 27 is not joined to the connector joining member 31, normal signals are not inputted in the trouble diagnosing module 11 and the indicator 17 is lighted. Thus, by the lighting of the indicator 17, the unconnectable state of the sub-connector 27, in other words, a bad connection of the main connector 22, is known. This means that an improper fit of the main connector 22 can be detected not only by visual inspection of an operator but also by the lighting of the indicator 17, and such an improper fit can be eliminated more accurately. Thus, the main connector 22 is joined to the connector joining member 31 accurately and electrically and an electrical continuity of the main circuit 16 is ensured. Therefore, at the time of a head-on collision of cars, power from the battery 14 is supplied to the inflator 12 to actuate it accurately and thus the operation of the airbag device 7 can be ensured stably.

Figure 11:
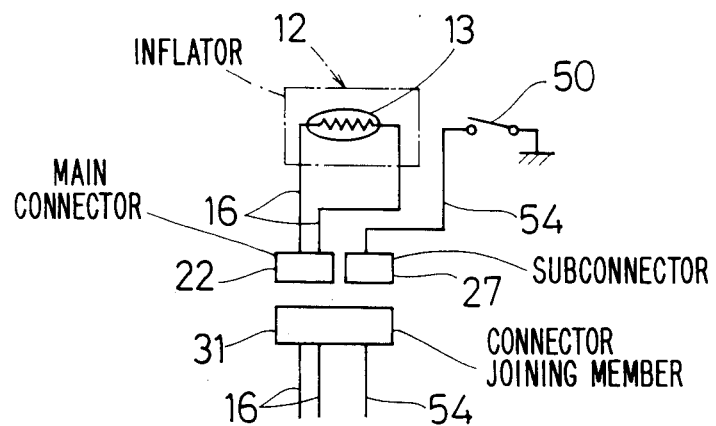
Figure 10:
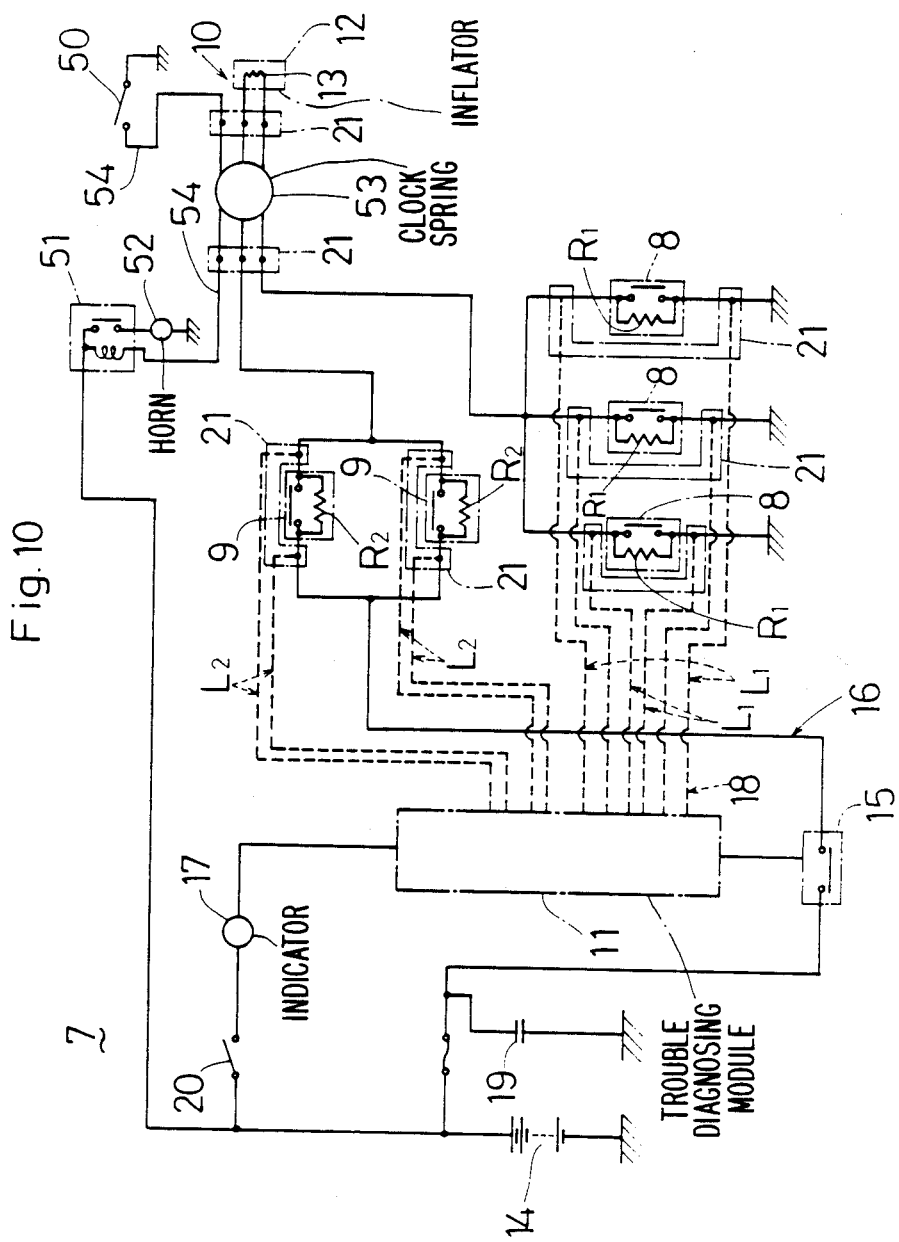

FIG. 9–FIG. 11 show another embodiment. The general composition of this embodiment is the same as that of the foregoing embodiment. Like reference numerals are given to the same parts as the foregoing embodiment and a detailed explanation thereof is omitted.

In this embodiment, as shown in FIG. 10, a circuit which applies current to the inflator 12 to actuate comprises a main circuit 16 and a horn circuit 54, which horn circuit causes a car horn to toot and forms a sub-circuit. The main circuit 16 and the horn circuit 54 (sub-circuit) are connected by the electric connecting devices 21, 21, . . . . Specifically, the horn circuit 54 connects a horn switch 50, a horn relay 51 and a horn 52 with the battery 14. The horn switch 50 is arranged unrevolvably at the central part of the steering wheel 4 and is switched ON by a man in the car. The horn relay 51 is excited by the switching ON operation of the horn switch 50 and ON operates. The horn 52 assumes an operation state by the switching ON of the horn relay 51 and toots.

The main circuit 16 connects the inflator 12 in series with each front sensor 8 and dash sensor 9. Connected to the horn circuit 54 between the horn switch 50 and the horn relay 51 and the main circuit 16 between the inflator 12 and the sensors 8, 9 are a clock spring 53 and the electric connecting devices 21, 21 peculiar to this embodiment. The clock spring 53 comprises a cable wound spirally about the steering shaft and even while the steering wheel 4 is turned, it ensures the transmission of electrical signals.

The electrical connecting devices 21, 21 have the same structure. The electric connecting device 21 on the horn switch 50 side (inflator 12 side) is described with reference to FIG. 9 and FIG. 11. The main connector 22 of this electric connecting device 21 forms the main circuits 16, 16 on the inflator 12 side, the sub-connector 27 forms the horn circuits 54 on the horn switch 50 side and the connector joining member 31 forms the main circuits 16, 16 and the horn circuits 54, 54.

In this embodiment, therefore, in the two electric connecting devices 21, 21 which connect the inflator 12 and sensors 8, 9 when each main connector 22 is connected perfectly to the main connector fitting part 34 of the connector joining member 31, connecting of the sub-connector 27 can be carried out. In this state, continuity of the horn circuit 54 is ensured.

On the other hand, when each main connector 22 is not connected electrically and perfectly to the connector joining member 31, the sub-connector 27 assumes a bad connection and the horn circuit 54 is put in an improper non-continuous state. Therefore, during the inspection of a production line of cars, the horn 52 will not toot even if the horn switch 50 is switched ON. As a result of this inspection, a bad connection of the main connector 22 can be detected accurately and thus such a bad connection can be corrected.

In these embodiments, the present invention is applied to the airbag device 7 but it is a matter of course that the present invention is applicable to various systems, including an antilock system for preventing the locking of brakes in an automobile during braking.

I claim:

1. An electric system comprising first signal lines which transmit operation signals to specified electrical components and second signal lines which transmit operation signals to electrical components other than the foregoing electrical components, a first connector, a second connector and a connector joining member connected to said first and second connectors and placing said signal lines individually in continuous states, said connector joining member including a housing, a first connector fitting part in the housing to which the first connector is fitted and connected electrically to place said first signal lines in a continuous state, a second connector fitting part which is connected electrically to said second connector by the fitting of said second connector thereto to place said second signal lines in a continuous state, and a fitting regulating means in the housing for regulating the fitting of said second connector to said second connector fitting part when said first connector is not fitted normally to said first connector fitting part.

2. An electric system as set forth in claim 1, wherein the second signal lines are connected to an alarm device which issues an abnormality alarm signal while the second connector is not fitted to the second connector fitting part of the connector joining member.

3. An electric system as set forth in claim 2, wherein the second signal lines comprise means for checking a continuous state of the first signal lines.

4. An electric system as set forth in claim 1, wherein the first signal lines comprise an airbag circuit which actuates an airbag device at the time of a collision of vehicles 5. An electric system as set forth in claim 4, wherein second signal lines comprise horn circuit means for tooting a vehicle horn.

6. An electric system as set forth in claim 4, wherein the airbag circuit has a power source, a sensor for detecting collision of vehicles, an inflator to inflate an airbag by introducing a gaseous body therein and a harness comprising the signal lines.

7. An electric system comprising main circuits and sub-circuits which check a continuity of said main circuits, a main connector, a sub-connector and a connector joining member connected to said main circuits and sub-circuits, said connector joining member including a housing, a main connector fitting part in the housing to which the main connector is fitted and which is connected electrically to said main connector so as to place said main circuits in a continuous state, a sub-connector fitting part which is connected electrically to said sub-connector and places said sub-circuits in a continuous state, and a fitting regulating means in the housing for regulating the fitting of said sub-connector to said sub-connector fitting part when said main connector is not fitted normally to said main connector fitting part.

8. An electric system as set forth in claim 7, wherein the main circuits comprise an airbag circuit to actuate an airbag device at the time of a collision of vehicles, said airbag circuit having a power source, a sensor for detecting collision of vehicles, an inflator to inflate said airbag by introducing a gaseous body therein and a harness comprising said main circuits and sub-circuits, said sensor being a switch type and connected with two power source lines and two trouble diagnosing lines, of which at least two said power source lines are connected to the main connector and at least one said trouble diagnosing line is connected to the sub-connector.

9. An electric connecting device comprising a connector joining member, a plurality of independent connectors connectable to said connector joining member, and a joining regulating means which, when at least one of said plurality of independent connectors is not joined normally to the connector joining member, regulates the joining of the remaining said independent connectors to the connector joining member.

10. An electric connecting device as set forth in claim 9, wherein the connector joining member comprises first and second connector joining parts, and the joining regulating means comprises a movable member provided movably between said connector joining parts, which movable member is positioned in front of the second connector joining part when said at least one of said plurality of independent connectors is not connected normally to the first connector joining part.

11. An electric connecting device as set forth in claim 10, wherein the movable member comprises a swingable plate supported swingably at its intermediate part about a support axis, one end of said swingable plate being normally positioned in front of the second connector joining part and the other end being engageable by said at least one of said independent connectors as said at least one of said independent connectors is joined to the first connector joining part.

12. An electric connecting device as set forth in claim 11, further comprising a spring which forces one end of the swingable plate to a position in front of the second connector joining part, said spring being disposed around the support axis.

13. An electric connecting device as set forth in claim 10, wherein a regulating plate is provided to the side of the swingable plate, one end of said regulating plate being fixed between the first and the second connector joining parts and the other end forming a protruding fitting part which, when said at least one of said independent connectors is not joined perfectly to the first connector joining part, makes contact with said at least one of said independent connectors and moves said other end of the regulating plate toward the front of the second connector joining part.

14. An electric connecting device as set forth in claim 13, wherein the regulating plate has at the fitting part thereof a tapered part which makes contact with said at least one of said independent connectors to be joined to the first connector joining part.

15. An electric connecting device as set forth in claim 13, wherein the regulating plate is made of flexible material.

16. An electric system comprising first signal lines which transmit operation signals to specified electrical components and second signal lines which transmit operation signals to electrical components other than the foregoing electrical components, a first connector, a second connector and a connector joining member connected to said first and second connectors and placing said signal lines individually in continuous states, said connector joining member including a first connector fitting part to which the first connector is fitted and connected electrically to place said first signal lines in a continuous state, a second connector fitting part which is connected electrically to said second connector by the fitting of said second connector thereto to place said second signal lines in a continuous state, and a fitting regulating means for regulating the fitting of said second connector to said second connector fitting part when said first connector is not fitted normally to said first connector fitting part.

17. An electric system as set forth in claim 16, wherein said fitting regulating means is interposed between said first connector fitting part and said second connector fitting part.

18. An electric system as set forth in claim 16, wherein the second signal lines are connected to an alarm device which issues an abnormality alarm signal while the second connector is not fitted to the second connector fitting part of the connector joining member.

19. An electric system as set forth in claim 18, wherein the second signal lines comprise means for checking a continuous state of the first signal lines.

20. An electric system as set forth in claim 16, wherein the first signal lines comprise an airbag circuit which actuates an airbag device at the time of a collision of vehicles.

21. An electric system as set forth in claim 20, wherein second signal lines comprise horn circuit means for tooting a vehicle horn.

22. An electric system as set forth in claim 20, wherein the airbag circuit has a power source, a sensor for detecting collision of vehicles, an inflator to inflate an airbag by introducing a gaseous body therein and a harness comprising the signal lines.

23. An electric system comprising main circuits and sub-circuits which check, a continuity of said main circuits, a main connector, a sub-connector and a connector joining member connected to said main circuits and sub-circuits, said connector joining member including a main connector fitting part to which the main connector is fitted and which is connected electrically to said main connector so as to place said main circuits in a continuous state, a sub-connector fitting part which is connected electrically to said sub-connector and places said sub-circuits in a continuous state, and a fitting regulating means for regulating the fitting of said sub-connector to said sub-connector fitting part when said main connector is not fitted normally to said main connector fitting part.

24. An electric system as set forth in claim 23, wherein said fitting regulating means is interposed between said main connector fitting part and said sub-connector fitting part.

25. An electric system as set forth in claim 23, wherein the main circuits comprise an airbag circuit to actuate an airbag device at the line of collision of vehicles, said airbag circuit having a power source, a sensor for detecting collision of vehicles, an inflator to inflate said airbag by introducing a gaseous body therein and a harness comprising said main circuits and sub-circuits, said sensor being a switch type and connected with two power source lines and two trouble diagnosing lines, of which at least two said power source lines are connected to the main connector and at least one said trouble diagnosing line is connected to the sub-connector.

* * * * *